United States Patent [19]

Vishe et al.

[11] 4,281,957
[45] Aug. 4, 1981

[54] PROJECTILE DOLLY FOR SEPARATE LOADING AMMUNITION

[76] Inventors: Richard A. Vishe, 2723 S. Queen St., York, Pa. 17403; Richard A. Koster, R.D. 11, York, Pa. 17406

[21] Appl. No.: 33,505

[22] Filed: Apr. 26, 1979

[51] Int. Cl.³ .................................................. B62B 1/14
[52] U.S. Cl. ..................................... 414/457; 414/490
[58] Field of Search ........................ 414/444, 453–457, 414/490; 280/47.17, 47.24, 47.26, 47.27, 35

[56] References Cited

U.S. PATENT DOCUMENTS

| | | | |
|---|---|---|---|
| 2,461,203 | 2/1949 | Evans | 414/490 |
| 2,500,055 | 3/1950 | Baker | 414/454 |
| 2,800,235 | 7/1957 | Reich | 414/457 X |
| 2,906,420 | 9/1959 | Garcia, Jr. | 414/456 X |
| 2,984,499 | 5/1961 | Humphrey | 280/47.24 X |
| 3,389,818 | 6/1968 | Rinehart | 414/457 X |
| 4,181,463 | 1/1980 | Mooney | 414/490 |

FOREIGN PATENT DOCUMENTS

| | | | |
|---|---|---|---|
| 791945 | 12/1935 | France | 280/47.24 |
| 1117140 | 5/1956 | France | 280/47.24 |
| 165687 | 11/1933 | Switzerland | 280/47.24 |

Primary Examiner—Robert W. Saifer
Attorney, Agent, or Firm—Kerkam, Stowell, Kondracki & Clarke

[57] ABSTRACT

A dolly for transporting projectiles of separate loading ammunition has a frame mounted on a pair of spaced rollers and has a manually engageable grip at the end thereof away from the rollers. A curved backing plate is mounted on the frame in front of the rollers and a lever is pivoted to the frame at a height appropriate to the length of the projectile. The end of the lever away from the rollers is provided with pin means to engage the ring in the projectile end closure plug and the other end of the lever is provided with a bail to assist in rotation of the lever to lift the projectile and permit it to swing against the backing plate. Latch means are mounted on the frame to lock the lever in position in which the projectile is raised and is lying against the backing plate. The arrangement of the pins in the lever is such that a pair of smaller diameter projectiles may be lifted onto the dolly at the same time or a single larger diameter projectile may be lifted onto the dolly.

1 Claim, 5 Drawing Figures

FIG. 1.
FIG. 2.
FIG. 3.
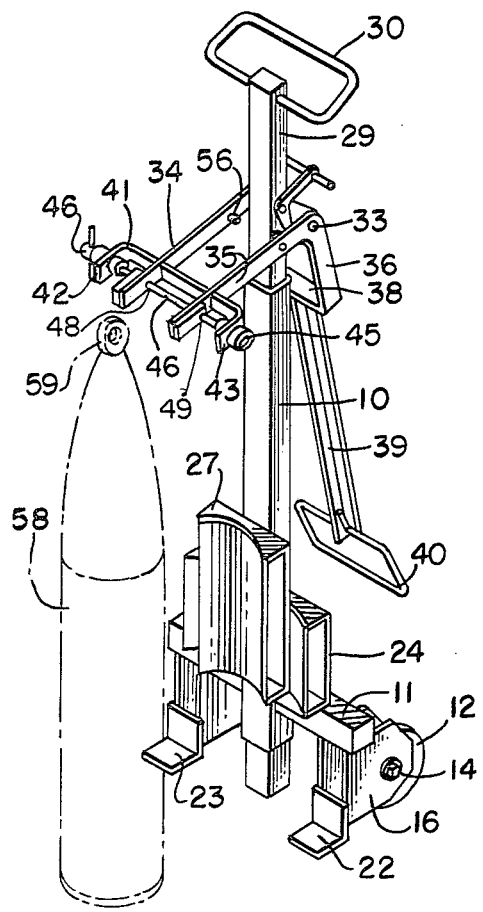
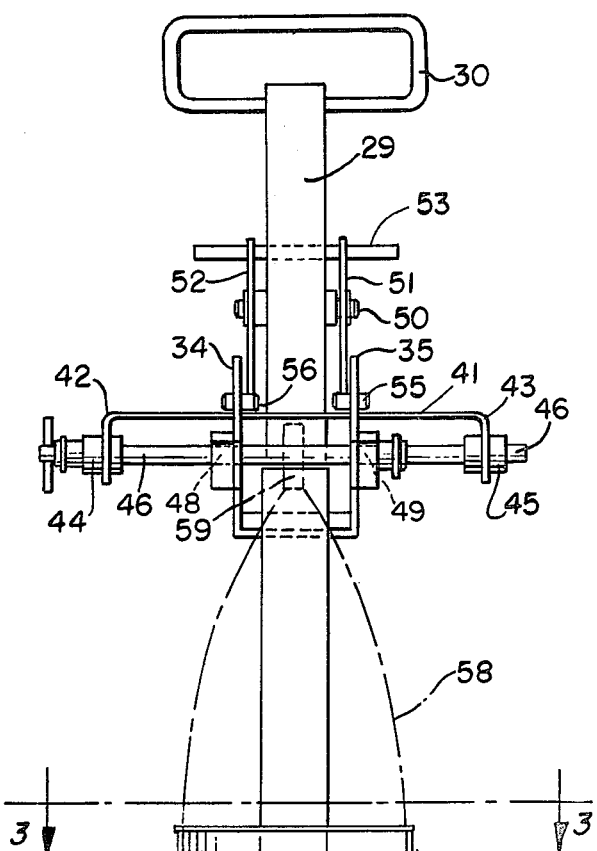
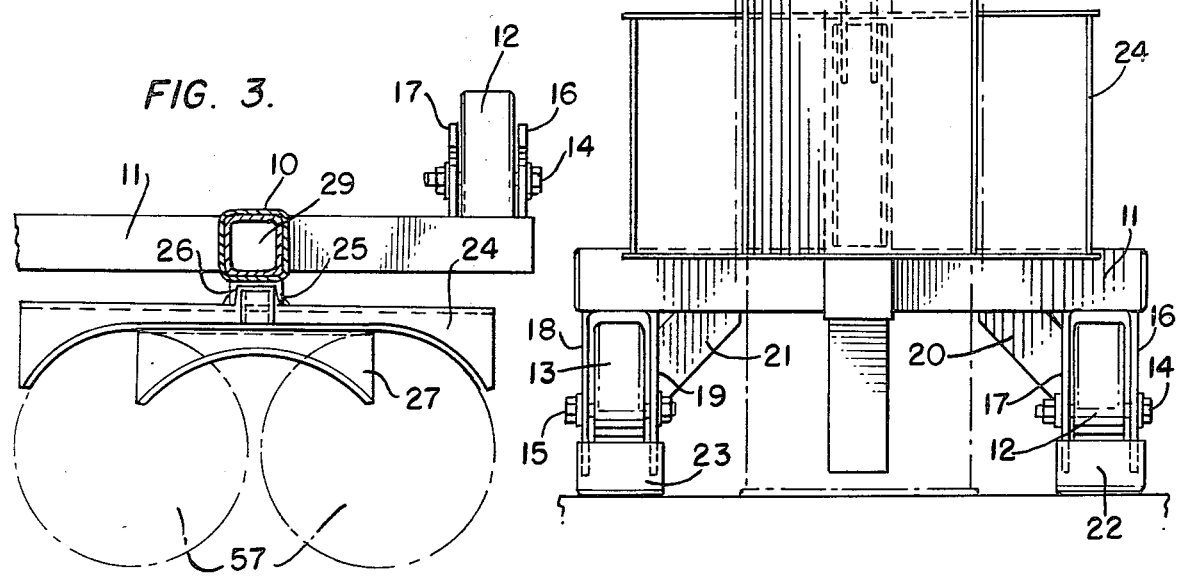

PROJECTILE DOLLY FOR SEPARATE LOADING AMMUNITION

I. DESCRIPTION

BACKGROUND OF THE INVENTION

Heretofore, wheeled dollies have been known for lifting and conveying cylindrical objects such as trash tins, gas cylinders, and the like, in which latches are mounted on the frame of the dolly to engage a suitable portion of the cylindrical object to hold the same with respect to the dolly so that during movement the cylindrical object cannot fall away from the dolly. Usually, a shoe on the forward lower edge of the dolly is engaged beneath the cylindrical object before the cylindrical object is locked to the dolly and the dolly is then rotated about its wheels or rollers to lift the object, for movement of the dolly and the cylindrical object. Levers mounted on the dolly frame are known for engaging a portion of the cylindrical object to lift the same prior to locking the cylindrical object to the dolly.

No prior art is known for a dolly for handing projectiles of separate loading ammunition and, more particularly, no dollies are known in the prior art in which a lever mounted on the dolly frame is provided with pin means for engaging the ring of the nose plug of the projectile or projectiles for lifting the projectile for movement against a supporting backing plate on the frame with means for locking the lever with respect to the housing in its projectile raised position.

BRIEF SUMMARY OF INVENTION

A dolly for moving projectiles of separate loading ammunition has a frame with spaced rollers mounted at one end thereof and with a manually engageable handle at the other end thereof. A lever is pivoted to the frame adjacent the handle end thereof and the end of the lever away from the rollers includes frame means receiving pins which pins pass through the rings of nose plugs of projectiles to be transported whereby when the lever is actuated the projectiles are lifted and move against a backing plate carried by the frame and suspended against this plate. A manually actuable latch locks the lever in projectile raised position. When a single projectile, usually of larger diameter, is to be moved, additional frame means at the end of the lever receives a single pin passing through the ring of the nose plug of the projectile and an auxiliary back plate suitable to the size of the projectile is located in front of the first plate so that when the lever is suitably actuated the single projectile is raised and moved into position against the second plate.

BRIEF DESCRIPTION OF THE DRAWINGS

FIG. 1 is a vertical elevation of a preferred embodiment of the present invention showing a single pin in position and the auxiliary plate in position for raising a larger projectile;

FIG. 2 is a view from the front of the embodiment of FIG. 1 with the single pin passing through the ring of the nose plug of the projectile and the projectile ready for engagement with the auxiliary plate;

FIG. 3 is a view on the line 3—3 of FIG. 2 showing the auxiliary plate in position for receiving a single larger projectile and also showing in outline two smaller projectiles in engagement with the first plate;

DESCRIPTION OF THE PREFERRED EMBODIMENT

Figure 4:
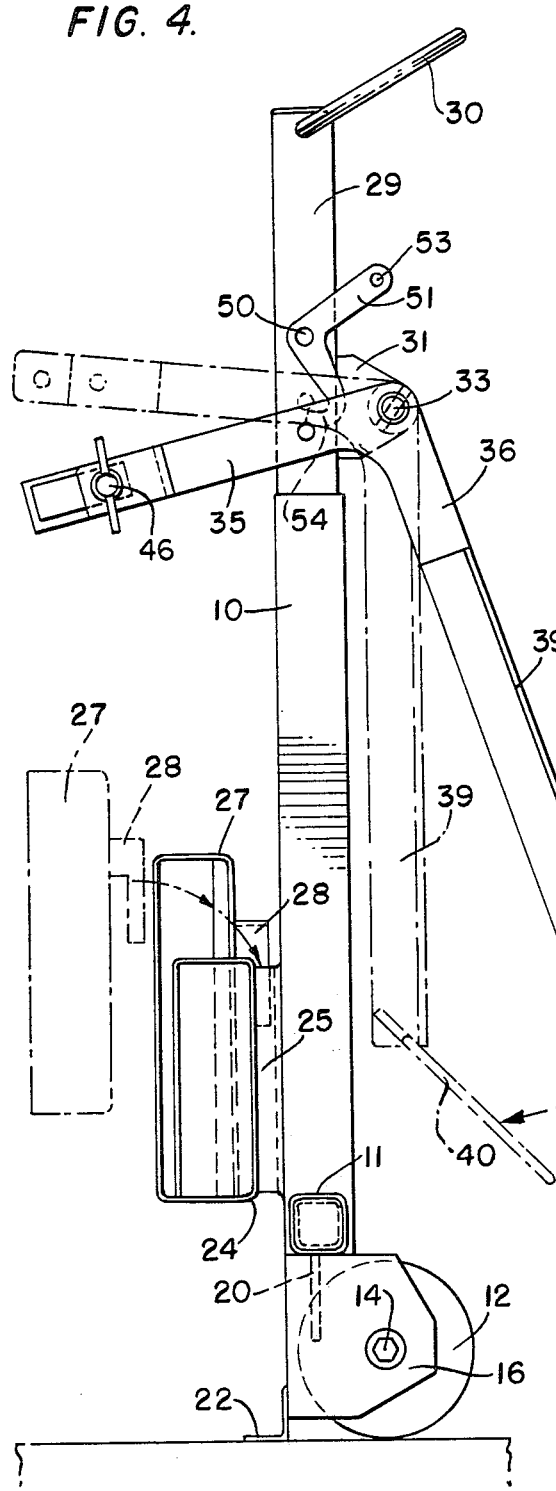
FIG. 4 is a side view of the embodiment of FIG. 1 showing the actuation of the lever and the manner of installation of the auxiliary plate; and, FIG. 5 is a view from the rear of the embodiment of FIG. 1 showing a pair of pins in position at the end of the lever for engaging a pair of rings of nose plugs of a pair of smaller projectiles.

The preferred embodiment of the present invention as shown in FIGS. 1–5 is intended to transport two projectiles of 155 mm diameter or one, 8 inch diameter projectile. Cannon of these calibers are presently used in highly mobile self-propelled field artillery weapons as, for example, those designated in the United States as Model M109 and variations thereof.

The dolly comprises a hollow frame member 10 rectangular in cross-section which carries at one end thereof cross-frame member 11 on which spaced rollers 12 and 13 are mounted on pins 14 and 15, respectively, which pins pass through spaced cheek members 16 and 17 and 18 and 19, respectively, which in turn are welded to cross-member 11. Gussets 20 and 21 may be employed to stiffen the roller housings and L-shaped toe piece 22 is secured to cheeks 16 and 17 away from roller 12 and a similar L-shaped piece 23 is secured to cheeks 18 and 19 away from roller 13 to support the dolly in upright position.

A curved plate 24 is secured to post 10 and its curvature is so designed as to receive two projectiles of 155 mm diameter as seen in FIG. 3.

As seen in FIG. 4, plate 24 is secured to frame element 10 by spaced webs 25 forming a channel 26 with housing 24. Auxiliary plate 27 is provided with a curvature suitable for receiving a projectile of 8 inch diameter and is further provided with a hook 28 (FIG. 4) which hook is engaged in channel 26 to lock auxiliary plate 28 against the face of plate 24 when a single projectile of 8 inch diameter is to be transported.

A hollow rod 29 square in cross-section is slidably mounted within frame member 10 to vary the effective height of the dolly in accordance with the length of the projectile or projectiles to be transported and terminates in a manually engageable bail 30 for use by the operator of the dolly. A block 31 is secured to the surface of rod 29 above rollers 12 and 13 and above frame member 10 and block 31 is through bored at 32 to receive pin 33. A space pair of lever elements 34 and 35 embrace rod 29 and have extensions 36 and 37 at right angles thereto and are pivotally mounted on pin 33. Elements 36 and 37 are joined by cross-member 38 to which is secured lever extension 39 terminating in bail 40.

A cross-frame member 41 is secured to frame members 34 and 35 and terminates in ends 42 and 43 extending parallel to members 34 and 35. Hollow guides 44 and 45 are mounted in extensions 42 and 43, respectively, to receive slide pin 46, which pin passes through openings provided in the adjacent portions of elements 34 and 35 respectively.

A pivot pin 50 passes through the rod 29 above pivot 33 and has lock members 51 and 52 pivotally mounted thereon and interconnected by cross-rod 53. Lock elements 51 and 52 terminate in hooked ends such as end 54 and end 54 engages under stud 55 on frame element 35 and the hooked end of lock member 52 engages under stud 56 mounted on frame element 34 when the lever assembly is in the position shown in broken line in FIG. 4 and when cross-rod 53 is manually pushed down.

Figure 5:
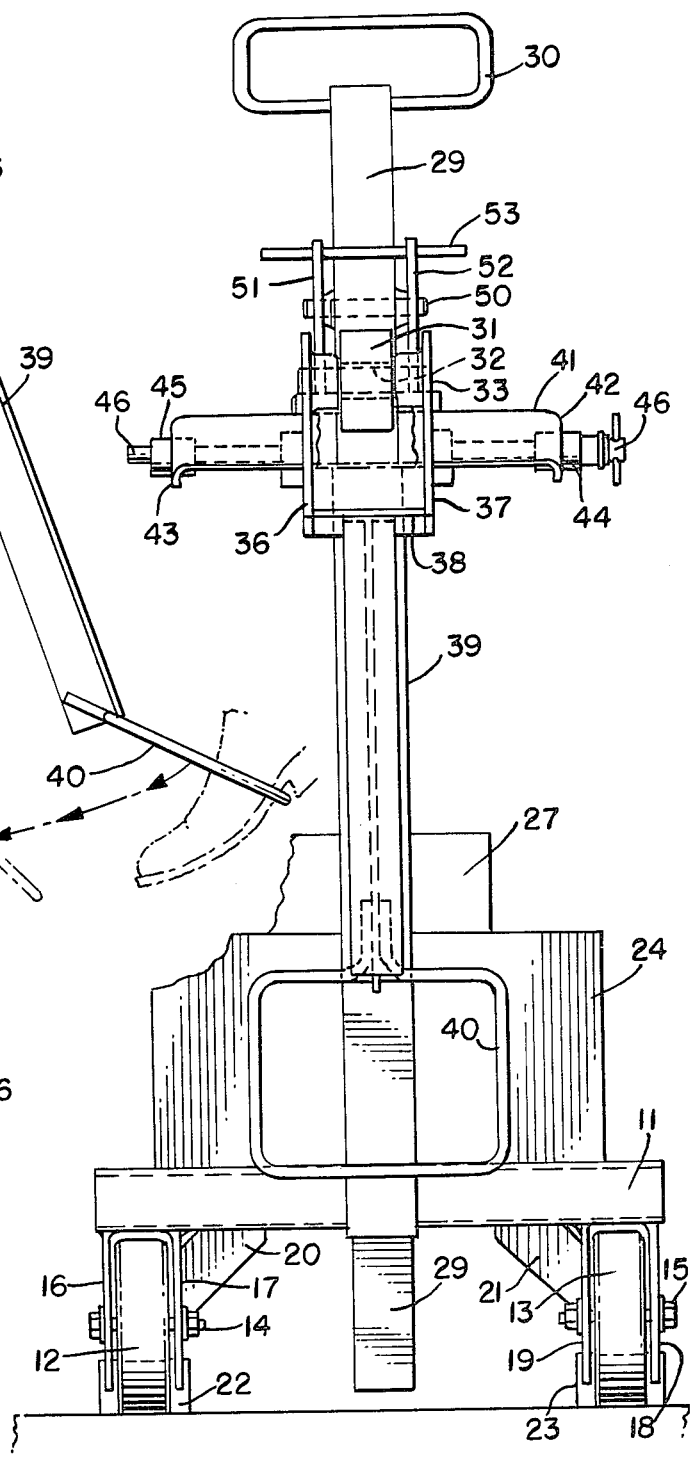

The use of the dolly of the preferred embodiment of this invention should be apparent from the above description thereof. When the dolly is to be used for transporting a single projectile 58 of, say 8-inch diameter, the auxiliary plate 27 is placed in position as shown in FIGS. 1, 2, 3, 4 and 5 and the dolly is wheeled adjacent the projectile to be moved. Latch elements 51 and 52 are disengaged and lever 39 is raised which lowers pin 46 to adjacent the opening of the ring 59 of the closing plug of the projectile. Pin 46 is then inserted through openings 48 and 49 in frames 34 and 35 to pass through ring 59. Lever 39 is then rotated in a counterclockwise direction as shown in FIG. 4 and pin 46 acting in ring 59 lifts projectile 58 and projectile 58 swings into contact with plate 27. Latch elements 51 and 52 are then rotated into position to engage lugs 55 and 56 to lock the lever assembly in the position shown by broken line in FIG. 4. The dolly is then manually actuated, as with a conventional dolly, to move the projectile to any desired position whereupon latches 51 and 52 are disengaged from lugs 55 and 56 permitting lever 39 to rotate about pivot 33 to lower the projectile to rest upon its base, pin 46 is removed and returned to its position as shown in FIGS. 4 and 5, and the dolly may then be moved for other use.

When a pair of smaller projectiles 57 (FIG. 3) are to be handled by the dolly, auxiliary plate 27 is removed and the dolly brought into position adjacent the pair of projectiles and pin 46 is slid outwardly so that the rings in the plugs in the ends of the projectiles 57 may enter the openings provided by extensions 42 and 43 with frame elements 34 and 35, respectively. Thereupon pin 46 is returned to the position shown by pin 46 in FIG. 2 passing through the rings in the end plugs of the projectiles. The procedure described above is then followed to lift the projectiles and swing them into position against plate 24 as seen in FIG. 3. The pair of projectiles may then be moved as desired and released from the dolly by reversing the procedure discussed above at which time pin 46 is slid outwardly and out of engagement with the rings on the end plugs of the projectiles and the dolly may be removed for use elsewhere.

We claim:

1. A dolly for handling at least one projectile of separately loading ammunition, the projectile having a nose plug and a ring for the plug, the dolly having a frame and a pair of spaced rollers mounted on an end of said frame, the improvement comprising a housing member mounted on said frame above and away from said rollers curved to accommodate the curvature of said at least one projectile;

a lever pivoted on said frame above said housing, an actuating arm for said lever on side of said frame above said rollers, at least one fork on said lever on a side of said frame above said housing;

a pin for sliding in said at least one fork to pass through the ring of the nose plug of said at least one adjacent projectile whereby when the dolly is moved adjacent an at least one projectile and said lever is rotated about the pivot in one direction said pin may be passed through the ring, and thereafter, movement of said lever in an opposite direction will lift the at least one projectile for swinging movement into engagement with said housing, said lever comprising a pair of spaced arms on opposite sides of said frame, a U-shaped cross-piece extending across and secured to said arms above said housing member, said arms extending beyond said U-shaped cross-piece forming a center fork and a fork on each side of said center fork and aligned openings in said forks to receive said pin.

* * * * *